United States Patent [19]

Cates et al.

[11] Patent Number: 4,621,337
[45] Date of Patent: Nov. 4, 1986

[54] TRANSFORMATION CIRCUIT FOR IMPLEMENTING A COLLAPSED WALSH-HADAMARD TRANSFORM

[75] Inventors: Billy E. Cates; Ronald S. Cok; Bryce E. Bayer, all of Rochester, N.Y.

[73] Assignee: Eastman Kodak Company, Rochester, N.Y.

[21] Appl. No.: 522,285

[22] Filed: Aug. 11, 1983

[51] Int. Cl.[4] .................... G06F 7/28; G06F 7/36; G06F 15/332; G06K 9/36
[52] U.S. Cl. .................................. 364/727; 382/43
[58] Field of Search ............... 364/725, 826, 727; 382/43, 41, 44, 47, 54; 343/5 DP

[56] References Cited

U.S. PATENT DOCUMENTS

| | | | |
|---|---|---|---|
| 3,792,355 | 2/1974 | Miyata et al. | 364/725 |
| 3,956,619 | 5/1976 | Mundy et al. | 235/156 |
| 4,134,134 | 1/1979 | Lux | 358/280 |
| 4,242,705 | 12/1980 | Ebihara | 358/167 |
| 4,245,330 | 1/1981 | Rebourg | 364/826 |
| 4,261,043 | 4/1981 | Robinson et al. | 364/727 |
| 4,300,182 | 11/1981 | Schweitzer | 364/727 |
| 4,357,677 | 11/1982 | Rebourg | 364/826 |
| 4,442,454 | 4/1984 | Powell | 358/167 |
| 4,463,377 | 7/1984 | Meyer-Ebrecht et al. | 364/727 |
| 4,510,578 | 4/1985 | Miyaguchi et al. | 364/425 |

OTHER PUBLICATIONS

"Hadamard Transform Image Coding," by W. K. Pratt, J. Kane and H. C. Andrews, *Proceedings of the IEEE*, vol. 57, No. 1, Jan. 1969, pp. 58-68.
"Transform Picture Coding," by P. A. Wintz, *Proceedings of the IEEE*, vol. 60, No. 7, Jul. 1972, pp. 809-820.
"Digital Techniques of Reducing Television Noise," by J. P. Rossi, Journal of the Society of Motion Picture and Television Engineers, Mar. 1978, pp. 134-140.

Primary Examiner—James D. Thomas
Assistant Examiner—Dale M. Shaw
Attorney, Agent, or Firm—David M. Woods

[57] ABSTRACT

A unit transformation circuit transforms three discrete input signals into a set of transform coefficient signals characteristic of a "collapsed" Walsh-Hadamard transform. The unit transformation circuit includes two tiers of arithmetic networks. In the first tier, a pair of arithmetic networks generates (A) first sum and difference signals from the first and second input signals and (B) second sum and difference signals from the second and third input signals. Arithmetic networks in the second tier generate a set of coefficient signals from (A) the sum of the first and second sum signals (B) the sum of the first and second difference signals and (C) the difference between the first and second difference signals. The unit transformation circuit forms a fundamental circuit element from which more complex circuits are constructed capable of transforming larger numbers of discrete input signals.

7 Claims, 8 Drawing Figures

TRANSFORMATION CIRCUIT FOR IMPLEMENTING A COLLAPSED WALSH-HADAMARD TRANSFORM

CROSS-REFERENCES TO RELATED APPLICATIONS

This patent application is related to (1) commonly assigned, copending patent application Ser. No. 441,826 now U.S. Pat. No. 4,442,454, entitled "Image Processing Method Using A Block Overlap Transformation Procedure," filed Nov. 15, 1982, (2) commonly assigned, copending patent application Ser. No. 522,284, now U.S. Pat. No. 4,553,165 entitled "Transform Processing Method for Reducing Noise In An Image," filed on even date herewith, and (3) commonly assigned copending patent application Ser. No. 522,278, now U.S. Pat. No. 4,549,212, entitled "Image Processing Method Using A Collapsed Walsh-Hadamard Transform," filed on even date herewith.

BACKGROUND OF THE INVENTION

1. Field of the Invention

The invention relates to a circuit for transforming a plurality of discrete signals. More specifically, the invention pertains to a circuit of the type used for generating the transform coefficient signals of a Walsh-Hadamard transform.

2. Description Relative to the Prior Art

In a conventional Walsh-Hadamard transform, the signals being transformed are discrete input signals in that each signal is an individually distinct entity representative of some distinct event that produces each discrete signal. Such transforms are used in connection with many types of signal processing applications. An exemplary application, and one that will be used hereinafter in describing a specific application for a transformation circuit, involves a circuit for processing signals derived from an image. In such a transformation circuit, the discrete input signals are image signals representative of the light value of elements of the image. (Light value, as used herein shall mean any image-related characteristic—e.g., lightness, brightness, density, hue and the like—that can be expressed in a form suitable for image processing.) For example, a 2 by 2 Walsh-Hadamard transform operates on a 2 by 2 array of discrete image signals generated from a 2 by 2 block of image elements, a 4 by 4 Walsh-Hadamard transform operates on a 4 by 4 array of image signals from a 4 by 4 block of image elements, and so on.

More specifically, let a 4 by 4 block of image elements be represented as a block of sixteen image elements $A_{ij}$, as follows.

$$\begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix} \quad (1)$$

The corresponding image signals are generated from the light values of these elements. The image signals are represented as an array of sixteen image signals $a_{ij}$, as follows.

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \quad (2)$$

An array of sixteen coefficient signals $c_{ij}$, $$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}$$

is generated from the image signals in sixteen linear arithmetic combinations characteristic of the 4 by 4 Walsh-Hadamard transform, as follows (in part).

$$c_{11} = a_{11} + a_{12} + a_{13} + a_{14} + a_{21} + a_{22} + a_{23} + a_{24} + \quad (3)$$
$$a_{31} + a_{32} + a_{33} + a_{34} + a_{41} + a_{42} + a_{43} + a_{44}$$

$$c_{12} = a_{11} + a_{12} - a_{13} - a_{14} + a_{21} + a_{22} - a_{23} - a_{24} + a_{31} +$$
$$a_{32} - a_{33} - a_{34} + a_{41} + a_{42} - a_{43} - a_{44}$$

$$c_{13} = a_{11} - a_{12} - a_{13} + a_{14} + a_{21} - a_{22} - a_{23} + a_{24} + a_{31} -$$
$$a_{32} - a_{33} + a_{34} + a_{41} - a_{42} - a_{43} + a_{44}$$

.

$$c_{44} = a_{11} - a_{12} + a_{13} - a_{14} - a_{21} + a_{22} - a_{23} + a_{24} + a_{31} -$$
$$a_{32} + a_{33} - a_{34} - a_{41} + a_{42} + a_{43} + a_{44}$$

Each coefficient signal is a particular linear combination of the light values from image elements within the block. Each combination represents a particular component of the image structure—such as detail—and tends to vanish in the absence of that particular kind of structure (coefficient signal $c_{11}$ represents an average component and thus would not ordinarily tend to vanish).

By inspecting these linear arithmetic combinations, it can be seen that each coefficient signal corresponds to a particular summation of all the image signals in the block, allowing some image signals to be positive (multiplied by +1) and others to be negative (multiplied by −1). In this connection, FIG. 1 is an abbreviated way of listing the arithmetic operations necessary to generate these linear combinations. The ±1 multipliers for each linear combination mentioned above are grouped into an array of sixteen multipliers, each multiplier corresponding in position to the image element, and signal, it operates upon. Sixteen such arrays are provided corresponding to tne sixteen linear arithmetic combinations mentioned above for generating the sixteen coefficient signals. (It will be evident from FIG. 1 how to form the missing arithmetic combinations not shown in the group of combinations (3)). The array composed of sixteen +1 multipliers generates an average coefficient signal (the $c_{11}$ coefficient signal) over the 4 by 4 block of image elements. The other fifteen arrays generate coefficient signals in response to differences in light value between image elements.

At this point, the transform coefficient signals may be processed in a number of ways depending upon the particular system application. For example, the coefficient signals of larger magnitude may be coded for signal transmission. In Ser. No. 441,826, now U.S. Pat. No. 4,442,454 (cross-reference (1)) noise in the image signals is reduced by modifying one or more of the coefficient signals. Whatever technique is used to process the coefficient signals, processed image signals $a'_{ij}$ are then recovered by inverse transforming the coefficient signals. Since the Walsh-Hadamard transform is exactly invertible, sixteen processed image signals $a'_{ij}$ are recovered by employing the sixteen combinations represented in FIG. 1, but now with the coefficient signals in place of the unprocessed image signals (and a proportionality factor of 1/16), as follows (in part).

$a'_{11} = 1/16(c_{11} + c_{12} + c_{13} + c_{14} + c_{21} + c_{22} + c_{23} + c_{24} +$
$c_{31} + c_{32} + c_{33} + c_{34} + c_{41} + c_{42} + c_{43} + c_{44})$ $a'_{12} = 1/16(c_{11} + c_{12} - c_{13} - c_{14} + c_{21} + c_{22} - c_{23} - c_{24} +$
$c_{31} + c_{32} - c_{33} - c_{34} + c_{41} + c_{42} - c_{43} - c_{44})$ $a'_{13} = 1/16(c_{11} - c_{12} - c_{13} + c_{14} + c_{21} - c_{22} - c_{23} + c_{24} +$
$c_{31} - c_{32} - c_{33} + c_{34} + c_{41} - c_{42} - c_{43} + c_{44})$

.
.
.

$a'_{44} = 1/16(c_{11} - c_{12} + c_{13} - c_{14} - c_{21} + c_{22} - c_{23} + c_{24} +$
$c_{31} - c_{32} + c_{33} - c_{34} - c_{41} + c_{42} + c_{43} + c_{44})$ (The combinations not shown above will be evident from inspection of FIG. 1.)

Since the computations of the Walsh-Hadamard transform require only real additions and subtractions, an arithmetic network of summing and differencing elements ordinarily performs the computational algorithm (see, for example, "Hadamard Transform Image Coding," by W. K. Pratt et al, *Proceedings of the IEEE*, Vol. 57, No. 1, Jan. 1969, 58–68 and the transform circuit diagrams described in co-pending Ser. No. 441,826, now U.S. Pat. No. 4,442,454). It is also known in the prior art to configure such arithmetic networks into a group of like processing modules. For example, in U.S. Pat. No. 3,956,619, a Walsh-Hadamard transformation circuit comprises a cascaded series of processor modules. The first processor module in the cascade receives a serial input data stream and, at its output, produces the Walsh-Hadamard transform coefficient signals of the input data stream taken two signals at a time. The output of the first signal processor module is applied to the input of a second signal processor module, which provides at its output the Walsh-Hadamard coefficient signals of the original input data stream taken four signals at a time, and so on.

FIG. 2 shows an arithmetic network 8 of the type disclosed in Ser. No. 441,826, now U.S. Pat. No. 4,442,454 (cross-reference (1)). The arithmetic network 8 carrys out a Walsh-Hadamard transform on four discrete signals $a_1$, $a_2$, $a_3$ and $a_4$. The transform is initiated by presenting these signals to a battery of 1 by 2 transforming networks 10. Each network 10 includes arithmetic units 12 and 14, the arithmetic unit 12 summing the two signals presented to it and the unit 14 differencing the two signals presented to it in accordance with the assigned polarities. The computation performed in the network of FIG. 2 provides four transform coefficient signals $c_1 \ldots c_4$, as follows:

$c_1 = a_1 + a_2 + a_3 + a_4$ $c_2 = a_1 + a_2 - a_3 - a_4$ $c_3 = a_1 - a_2 + a_3 - a_4$ $c_4 = a_1 - a_2 - a_3 + a_4$

These coefficient signals may represent the transform of a 1 by 4 string of discrete signals $a_1 \ldots a_4$ or a 2 by 2 array of discrete signals $a_1 \ldots a_4$, depending on the sampling scheme and informational meaning attached to the discrete signals $a_1 \ldots a_4$. For example, the coefficient signals $c_1 \ldots c_4$ may be obtained by transforming a 2 by 2 array of image signals that are derived from a 2 by 2 block of image elements.

When the transform coefficient signals from a 2 by 2 Walsh-Hadamard transform are modified to reduce noise and inverted, certain artifacts sometimes appear in the processed image. These artifacts relate to an unwanted activation of the noise reduction in smooth areas of scene objects. The appearance of these artifacts in the processed image resembles "edges" inserted in places where they should not be. Such "false edge" artifacts interfere with the correct portrayal of the image and are therefore aesthetically undesirable.

SUMMARY OF THE INVENTION

When the transform coefficient signals from a 4 by 4 Walsh-Hadamard transform are modified to reduce noise and inverted, particularly in accordance with Ser. No. 522,284, now U.S. Pat. No. 4,553,165, (cross-reference (2)), "false edge" artifacts in the processed are reduced compared to results obtained with a smaller (2by 2) Walsh-Hadamard transform. However, while the occurrence of such false "edges" are reduced by using the 4 by 4 Walsh-Hadamard transform, low contrast detail in the processed image is degraded compared to the processed image obtained from the smaller (2 by 2) Walsh-Hadamard transform.

A better compromise is struck between the removal of "false edge" artifacts and the preservation of low-contrast detail if a modification is applied to a conventional Walsh-Hadamard transform. Ordinarily, in taking a 4 by 4 transform of discrete image signals, the signal values involved in the transform are derived from 4 elements of 4 lines of the original image, for a total of 16 discrete signals from 16 image elements. In Ser. No. 522,278, now U.S. Pat. No. 4,549,212 (cross-reference (3)), it is pointed out that the Walsh-Hadamard transform can be used to better advantage in processing arrays of such image signals if the transform generates its characteristic linear combinations from an unconventional ordering of the image signals available to the transform. More specifically, the array of image signals obtained from a specific block, e.g., 3 by 3, of image elements is mapped into a larger array of image signals, e.g., 4 by 4. The larger array, including some image signals that appear more than once, is then transformed in accordance with the characteristic Walsh-Hadamard linear combinations appropriate for the larger array. In effect, the Walsh-Hadamard transform method is collapsed upon a smaller block of image elements than is usual for the given size of transform. (The "collapsed" Walsh-Hadamard transform is introduced and discussed in Ser. No. 522,278, now U.S. Pat. No. 4,549,212 cross-rererence (3).) By completing the coefficient modification (to reduce noise) and inverse transforming with respect to the larger signal array, "false edge" artifacts are minimized while the low-contrast detail is preserved.

The "collapsed" Walsh-Hadamard transform may be characterized by an unconventional and redundant ordering of the discrete input signals presented to an arithmetic network for Walsh-Hadamard transform. We have invented a unit transformation circuit that takes advantage of these redundancies. In addition, the unit transformation circuit is a fundamental circuit element—a building block—such that a "collapsed" Walsh-Hadamard transformation circuit for a signal array of any practical size can be formed of a combination of unit transformation circuits.

In accordance with our invention, the unit transformation circuit transforms three discrete input signals into a set of "collapsed" transform coefficient signals. The unit circuit includes a) means for generating a first sum signal and a first difference signal from the first and second of the three discrete input signals and b) means for generating a second sum signal and a second difference signal from the second and third discrete input signals. A first transform coefficient signal is generated from the sum of the first and second sum signals; a second transform coefficient signal from the sum of the first and second difference signals; and a third transform coefficient signal from the difference between the first and second difference signals. In addition, the set of transform coefficient signals characteristic of a "collapsed" Walsh-Hadamard transform performed on three discrete input signals includes a fourth transform coefficient signal that is the same as the second transform coefficient signal. This redundant coefficient signal may be provided by directly duplicating the second coefficient signal. Alternatively, if the unit transformation circuit is used to inverse transform the three distinct transform coefficient signals, the fourth transform coefficient signal is automatically accounted for in the internal configuration of the unit transformation circuit.

A transformation circuit processing a larger number of discrete input signals is made up of a combination of the unit transformation circuits. Since the "collapsed" Walsh-Hadamard transform is exactly invertible, the transform coefficient signals are inverse transformed into processed discrete signals by use of a combination of the same unit transformation circuits.

BRIEF DESCRIPTION OF THE DRAWINGS

The invention will be described with reference to the figures, wherein:

Figure 1:
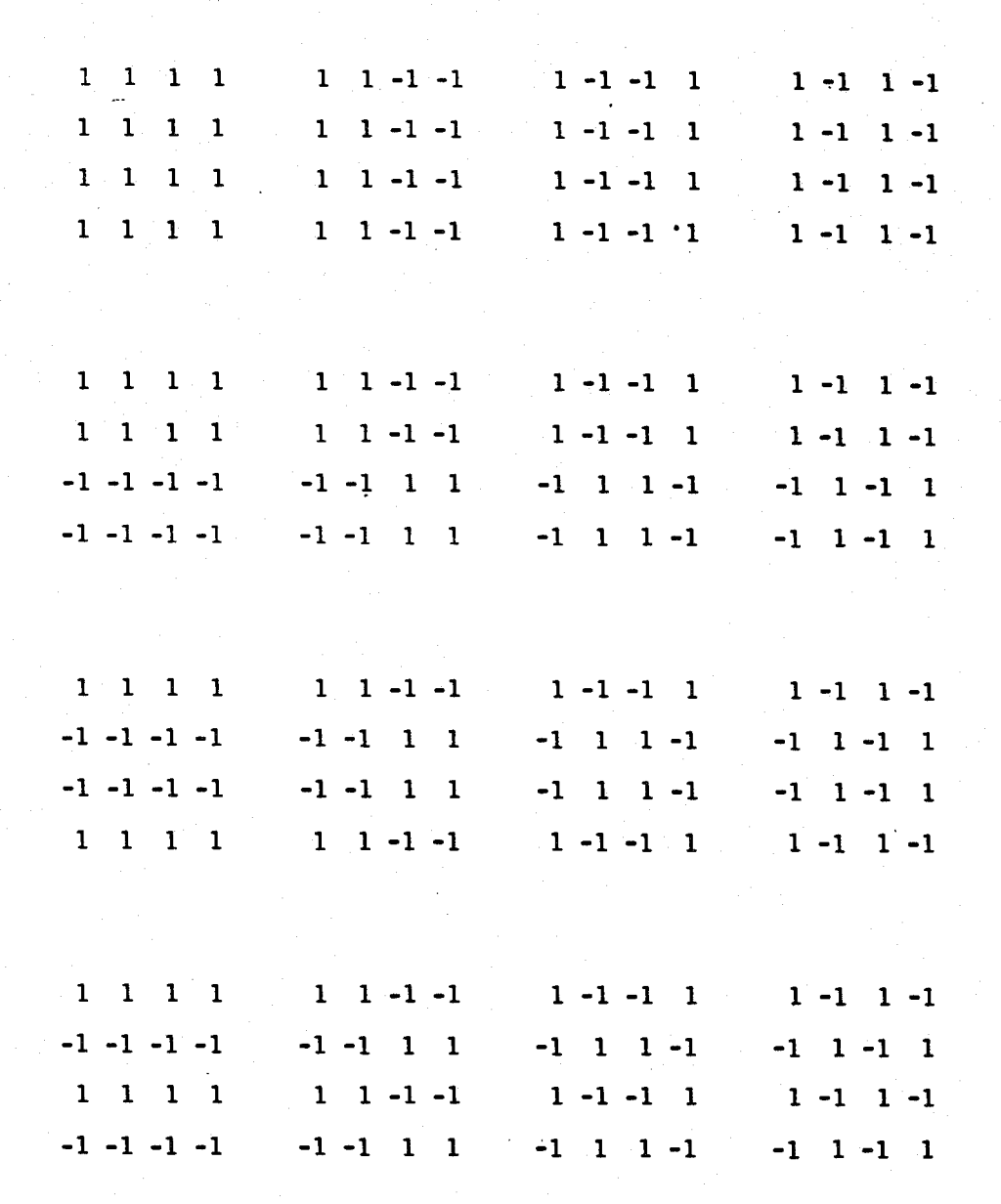

FIGS. 1 and 3 are tabular listings of the arithmetic combinations for generating the coefficient signals of a 4 by 4 and a "collapsed" 4 by 4 Walsh-Hadamard transform, respectively;

DESCRIPTION OF THE PREFERRED EMBODIMENT

Figure 2:
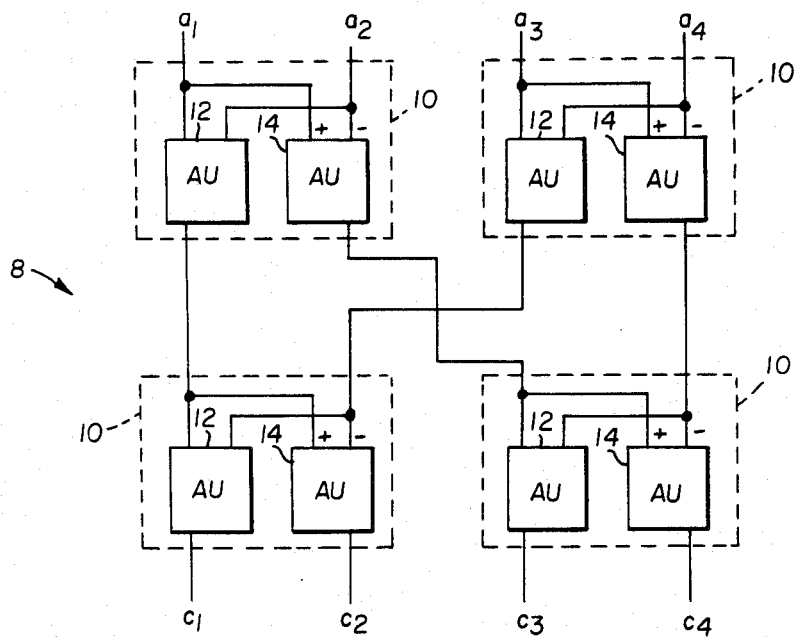
FIG. 2 is a circuit diagram of a known arithmetic network for generating Walsh-Hadamard transform coefficient signals from four discrete input signals.

The sixteen signal values for the "collapsed" Walsh-Hadamard transformation are taken from the nine elements of a 3 by 3 block instead of the sixteen elements of a 4 by 4 block. That is, from the 3 by 3 block of image elements $$\begin{bmatrix} A_{11} & A_{12} & A_{13} \\ A_{21} & A_{22} & A_{23} \\ A_{31} & A_{32} & A_{33} \end{bmatrix}$$

a 3 by 3 array of image signals $a_{ij}$, $$\begin{bmatrix} a_{11} & a_{12} & a_{13} \\ a_{21} & a_{22} & a_{23} \\ a_{31} & a_{32} & a_{33} \end{bmatrix} \quad (4)$$

is generated from the light values of the image elements.

These nine image signals $a_{11} \ldots a_{33}$ are mapped into a 4 by 4 array of image signals suitable for transformation, as follows.

$$\begin{bmatrix} (a_{11}) & (a_{12}) & (a_{12}) & (a_{13}) \\ (a_{21}) & (a_{22}) & (a_{22}) & (a_{23}) \\ (a_{21}) & (a_{22}) & (a_{22}) & (a_{23}) \\ (a_{31}) & (a_{32}) & (a_{32}) & (a_{33}) \end{bmatrix} \quad (5)$$

This is done by using image signals $a_{11}$, $a_{13}$, $a_{31}$ and $a_{33}$ once; $a_{12}$, $a_{21}$, $a_{23}$ and $a_{32}$ twice; and $a_{22}$ four times. An array of sixteen coefficient signals $c_{ij}$, $$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix}$$

is generated from the 4 by 4 array (5) of image signals in sixteen arithmetic combinations identical to those used (combinations (3)) for the 4 by 4 Walsh-Hadamard transform, excepting that certain of the image signals appear more than once in a given linear combination, as follows (in part):

$$c_{11} = a_{11} + a_{12} + a_{12} + a_{13} + a_{21} + a_{22} + a_{22} + a_{23} + \quad (3)$$
$$a_{21} + a_{22} + a_{22} + a_{23} + a_{31} + a_{32} + a_{32} + a_{33}$$

$$c_{12} = a_{11} + a_{12} - a_{12} - a_{13} + a_{21} + a_{22} - a_{22} - a_{23} + a_{21} +$$
$$a_{22} - a_{22} - a_{23} + a_{31} + a_{32} - a_{32} - a_{33}$$

$$c_{13} = a_{11} - a_{12} - a_{12} + a_{13} + a_{21} - a_{22} - a_{22} + a_{23} + a_{21} -$$
$$a_{22} - a_{22} + a_{23} + a_{31} - a_{32} - a_{32} + a_{33}$$

-continued $$c_{44} = a_{11} - a_{12} + a_{12} - a_{13} - a_{21} + a_{22} - a_{22} + a_{23} + a_{21} -$$
$$a_{22} + a_{22} - a_{23} - a_{31} + a_{32} - a_{32} + a_{33}$$

Because of the duplication among image signals, combinations (6) reduce to (in part):

$$c_{11} = a_{11} + 2a_{12} + a_{13} + 2a_{21} + 4a_{22} + \qquad (7)$$
$$2a_{23} + a_{31} + 2a_{32} + a_{33}$$

$$c_{12} = a_{11} - a_{13} + 2a_{21} - 2a_{23} + a_{31} - a_{33}$$

$$c_{13} = a_{11} - 2a_{12} + a_{13} + 2a_{21} - 4a_{22} +$$
$$2a_{23} + a_{31} - 2a_{32} + a_{33}$$

.
.
.

$$c_{44} = a_{11} - a_{13} - a_{31} + a_{33}$$

Figure 3:
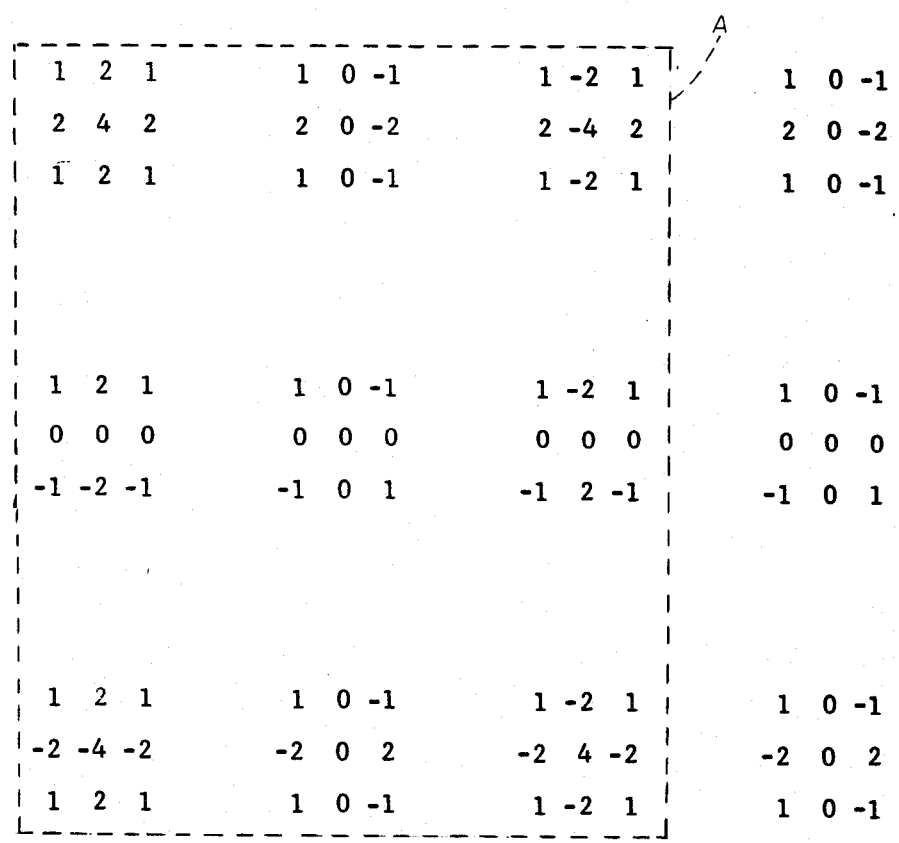

FIG. 3 is a list of the sixteen arrays of multipliers (ranging from 0 to ±4) used in these sixteen arithmetic combinations for generating the corresponding sixteen coefficient signals $c_{ij}$. (As with the 4 by 4 Walsh-Hadamard transform, it is evident from FIG. 3 how to construct the linear combinations not explicitly shown above). The list of arrays in FIG. 3 can also be derived by inspecting FIG. 1 and combining like signals. In other words, by applying the same weight of ±1 to each signal value as shown in the arithmetic combinations of FIG. 1 and combining the weights for the elements used more than once, the sixteen combinations illustrated in FIG. 1 are condensed into the sixteen "collapsed" arithmetic combinations of FIG. 3. When incorporating these modifications, the Walsh-Hadamard transform will be hereinafter referred to as a "collapsed" Walsh-Hadamard transform since the characteristic linear combinations are "collapsed" upon a smaller field of image elements than is conventional in the prior art.

Figure 4:
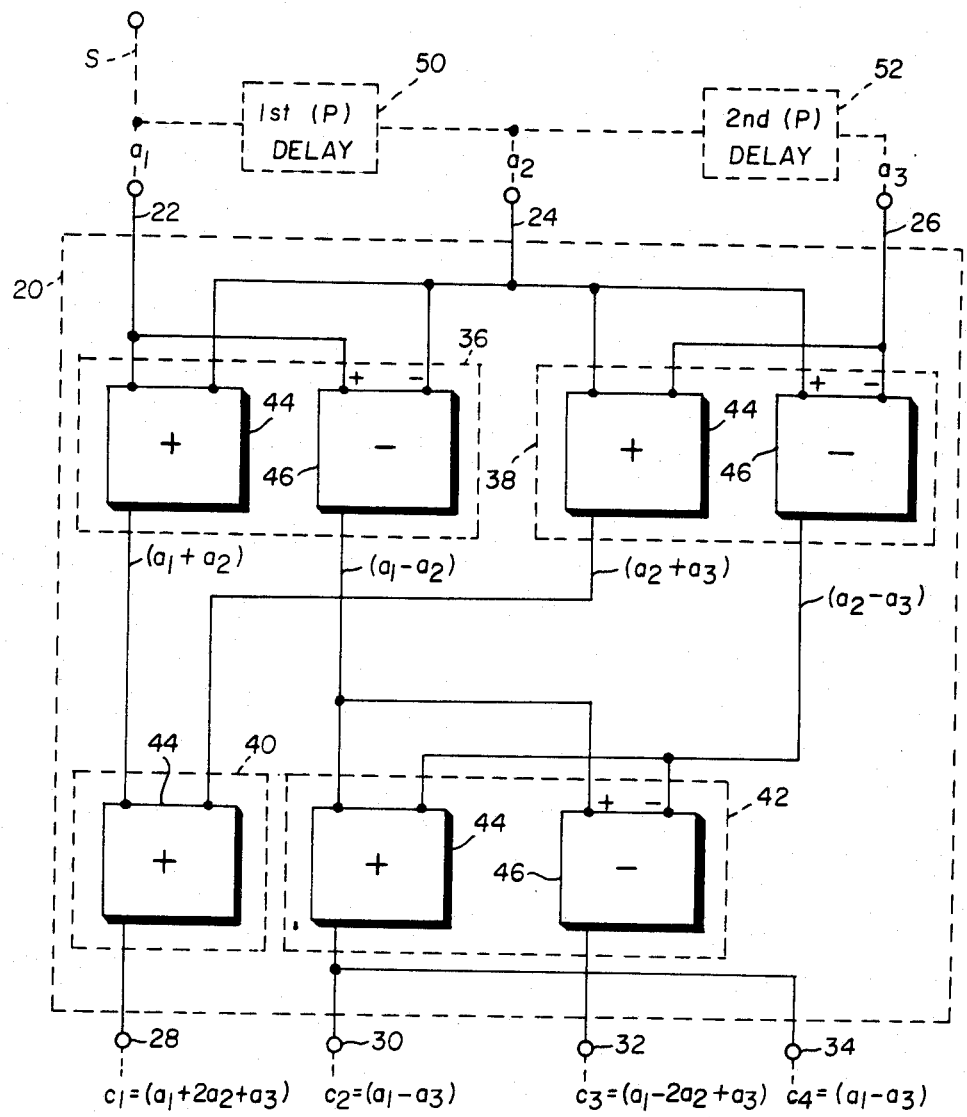
FIG. 4 is a circuit diagram of a unit transformation circuit according to the invention for generating "collapsed" Walsh-Hadamard transform coefficient signals from three discrete input signals.

The invention will be described in accordance with a unit transformation circuit which may be used as a basic element for constructing larger transformation circuits. In FIG. 4, a unit transformation circuit 20 is shown in accordance with the invention. Three discrete input signals $a_1 \ldots a_3$ are applied to input terminals 22, 24 and 26. The unit transformation circuit 20 generates four transform coefficient signals $c_1 \ldots c_4$ (at four output terminals 28, 30, 32 and 34) from four linear arithmetic combinations of the discrete input signals $a_1 \ldots a_3$. These linear arithmetic combinations are characteristic of the application of the "collapsed" Walsh-Hadamard transform to three discrete input signals, as follows:

$$c_1 = a_1 + 2a_2 + a_3 \qquad (8)$$
$$c_2 = a_1 \qquad - a_3$$
$$c_3 = a_1 - 2a_2 + a_3$$
$$c_4 = a_1 \qquad - a_3$$

The arithmetic calculations are performed in two tiers of arithmetic networks: a first arithmetic network 36 and a second arithmetic network 38 in the first tier, and a third arithmetic network 40 and a fourth arithmetic network 42 in the second tier. The arithmetic networks 36, 38, 40 and 42 include arithmetic units 44 and 46. The unit 44 performs the addition of two signals and generates a corresponding sum output signal. The unit 46 performs the difference of two signals and generates a corresponding difference output signal. The subtrahend input to the difference unit 46 is indicated with a negative (−) sign adjacent its input terminal.

As shown in FIG. 4, the first arithmetic network 36 operates upon the two signals $a_1$ and $a_2$, producing at its output a first sum signal ($a_1 + a_2$) and a first difference signal ($a_1 - a_2$). The second arithmetic network 38 operates upon the two signals $a_2$ and $a_3$, producing at its output a second sum signal ($a_2 + a_3$) and a second difference signal ($a_2 - a_3$). The third arithmetic network 40 operates upon the first sum signal and the second sum signal, producing at its output a third sum signal ($a_1 + 2a_2 + a_3$), that is, coefficient signal $c_1$. The fourth arithmetic network 42 operates upon the first difference signal and the second difference signal, producing at its output a fourth sum signal ($a_1 - a_3$) and a third difference signal ($a_1 - 2a_2 + a_3$), that is, coefficient signals $c_2$ and $c_3$, respectively.

It will be noted that the four linear arithmetic combinations (8) characteristic of a "collapsed" Walsh-Hadamard transform include two combinations (i.e. transform coefficient signals, $c_2$ and $c_4$) that are identical. While this redundancy eliminates the need to calculate them separately, the fourth transform coefficient signal is still introduced into the inverse transform process. In FIG. 4 the fourth coefficient signal is produced by connecting a duplicate terminal 34 to the summing output of the fourth arithmetic network 42.

The unit transformation circuit 20 operates on three discrete input signals $a_1 \ldots a_3$ presented to the input terminals 22, 24 and 26 at substantially the same time. While the mode of presentation is not critical to practice of the invention, FIG. 4 shows (in broken line) a suitable arrangement for providing time-wise alignment of the signals $a_1 \ldots a_3$. A stream of signals S is presented to the input terminal 22 and to a first delay means 50. The output signal from the first delay means 50 is presented to the input terminal 24 and to a second delay means 52. The output signal from the second delay means 52 is presented to the input terminal 26. Each delay means 50 and 52 is configured to provide a delay of some predetermined period P. In the case of an image processing apparatus using the unit transformation circuit 20, the period P would ordinarily correspond to a line interval or to the sampling period of an image element.

Figure 5:
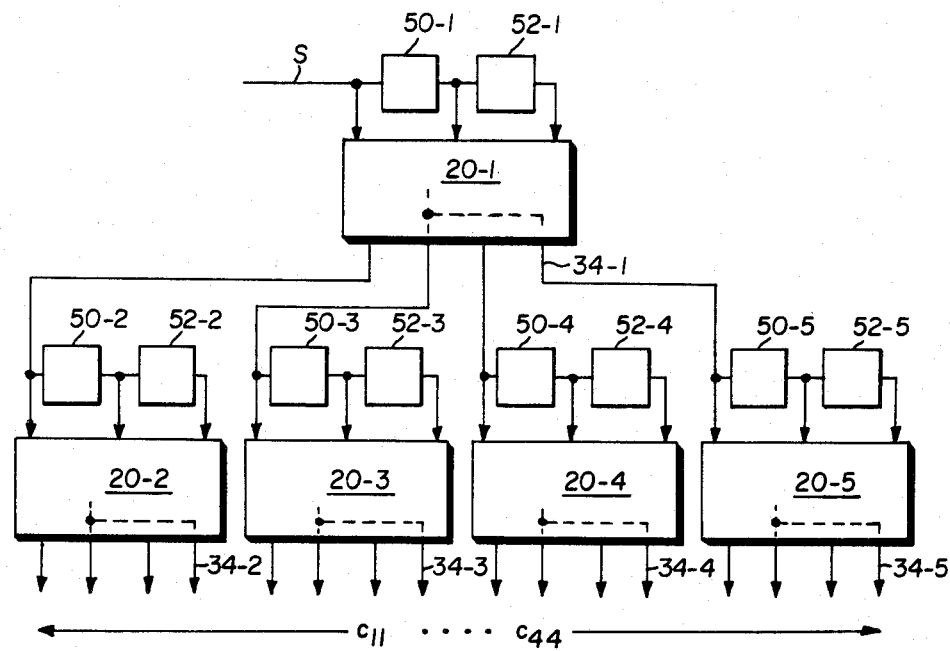
FIG. 5 is a circuit diagram of a combination of unit transformation circuits according to FIG. 4 for generating the "collapsed" Walsh-Hadamard coefficient signals of a 3 by 3 array of discrete input signals.
Figure 6:
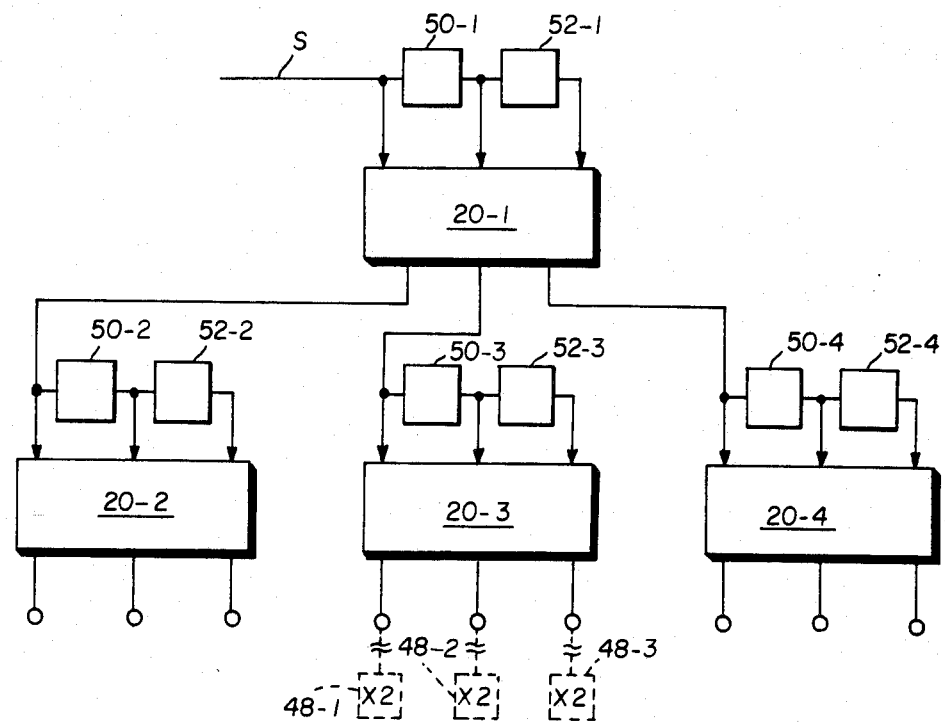
FIG. 6 is a circuit diagram showing a more compact version of the circuit diagram of FIG. 5 by taking advantage of certain redundancies in the "collapsed" Walsh-Hadamard transform.
Figure 7:
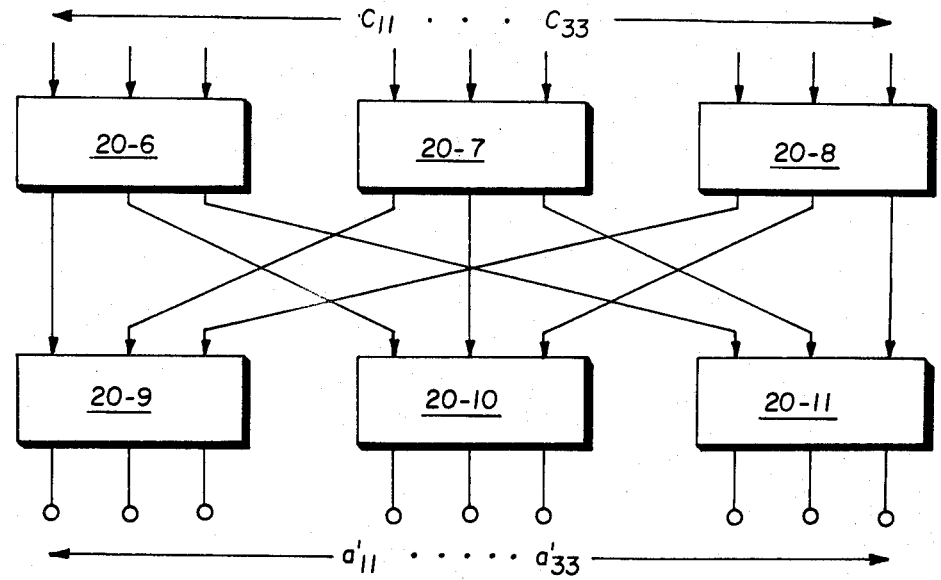
FIG. 7 is a circuit diagram showing a combination of the unit transformation circuits according to FIG. 4 suitable for inverse transforming the coefficient signals output from the circuit described in FIG. 6.

The unit transformation circuit 20 forms a fundamental circuit element from which more complex transformation circuits can be constructed. In this connection, FIGS. 5, 6 and 7 show combinations of unit transformation circuits 20 in more complex circuits suitable for image processing. FIG. 5 shows a configuration of five unit transformation circuits labeled 20-1 to 20-5 and corresponding delay means labeled 50-1 to 50-5 and 52-1 to 52-5. The incoming signal S represents a stream of image signals obtained by sampling a two-dimensional image. Each delay 50-1 and 52-1 provides one image line delay while each delay 50-2 to 50-5 and 52-2 to 52-5 provides one image element delay. The configuration of FIG. 5 processes a 3 by 3 array (represented hereinbefore as array (4)) of discrete image signals representing a nine-element block of the image.

The 4 by 4 Walsh-Hadamard transform "collapsed" upon a 3 by 3 array of image signals involves a considerable number of redundant transform coefficient signals.

The provision for these redundant coefficient signals is shown in FIG. 5 by the series of duplicate terminals 34-1 to 34-5, which are each shown internally connected (in broken line) within the respective unit transformation circuit to the output carrying the fourth sum signal. The sixteen output terminals of the unit transformation circuits 20-2 to 20-5 provide the coefficient signals $c_{11} \ldots c_{44}$ of the "collapsed" Walsh-Hadamard transform. These coefficient signals $c_{11} \ldots c_{44}$ are the same as the sixteen linear arithmetic combinations heretofore shown as combinations (7) and calculated according to the multiplier arrays shown in FIG. 3.

The transform coefficient signals $c_{11} \ldots c_{44}$ generated by the combination of unit transformation circuits 20-1 to 20-5 shown in FIG. 5 are useful in a number of processes. For example, the coefficient signals may be quantized and coded for purposes of picture transmission (see the previously cited Pratt article and the survey of quantizing and coding techniques presented in "Transform Picture Coding," P. A. Wintz, *Proceedings of the IEEE*, Vol. 60, No. 7, July 1972, 809–820). In another image process noise is reduced in the processed image by modifying one or more of the coefficient signals, typically by either coring or clipping. Coring is a non-linear noise reduction process that removes coefficient signal energy—presumably noise—near the average coefficient signal axis and less than a threshold; signal energy in the remaining coefficient signals is then combined with low-pass signal energy represented by the average coefficient signal. The effect of this combination occurs during the inverse transformation of the coefficient signals. (See "Digital Techniques of Reducing Television Noise," by J. P. Rossi, *Journal of the Society of Motion Picture and Television Engineers*, March 1978, pp. 134–140). Clipping is a complementary process that removes coefficient signal energy—presumably image detail—that is above a threshold; the noise signal remaining after inverse transformation is then subtracted from a full-band image signal. These noise reduction processes are discussed in greater detail in the three cross-referenced patent applications.

The transform coefficient signals $c_{11} \ldots c_{44}$ produced by the circuit configuration of FIG. 5 may be inverse transformed into a 4 by 4 array of processed image signals $a'_{11} \ldots a'_{33}$ (corresponding to the array (5) of image signals $a_{11} \ldots a_{33}$, that is, with some processed image signals $a'_{ij}$ being duplicated) by a conventional Walsh-Hadamard inverse transform circuit suitable for operating on a 4 by 4 array of transform coefficient signals. (Copending patent applications Ser. Nos. 522,284 and 522,278 (cross-references (2) and (3), respectively), also describe suitable inverse transform circuits.) Furthermore, and in accordance with the teaching of Ser. No. 522,284 (cross-reference (2)), certain of the transform coefficient signals may be left out of the inverse transform in order to minimize the occurrence of the "false edge" artifact.

Because of the redundant transform coefficient signals involved in the "collapsed" Walsh-Hadamard transform, the combination of unit transformation circuits 20-1 to 20-5 shown in FIG. 5 is preferably reduced to the smaller combination of unit transformation circuits 20-1 to 20-4 shown in FIG. 6. The arrangement of delay means 50-1 to 50-4 and 52-1 to 52-4 effect an ordering of discrete signals from the signal stream S such that the array (4) of image signals $a_{ij}$ is transformed by the unit transformation circuits 20-1 to 20-4. In the case of FIG. 6, the duplicate coefficient signal terminals 34-1 to 34-5 shown in FIG. 5 are not used (therefore eliminating the need for the terminals 34-1 to 34-5 and the unit transformation circuit 20-5, also shown in FIG. 5). Of the sixteen coefficient signals of the 4 by 4 "collapsed" Walsh-Hadamard transform, nine coefficient signals are distinct signal entities and are provided by the circuit of FIG. 6. These nine distinct coefficient signals are the transform coefficient signals $c_{11} \ldots c_{33}$ derived from the nine operations represented by the nine arrays within the broken line box A of FIG. 3.

Nonetheless, provision must be made elsewhere in the overall image processing circuit to account for the absence of the other seven redundant coefficient signals. This may be done by suitably scaling the magnitude of the coefficient signals that are duplicated. This is done in two ways. The transform coefficient signals provided by the eliminated unit transformation circuit 20-5 (in FIG. 5) are generated by a set of multiplying circuits 48-1 to 48-3 shown in FIG. 6. These multiplying circuits double the magnitude of the appropriate coefficient signals. The transform coefficient signals provided by the eliminated terminals 34-2 to 34-4 are generated by use of the unit transformation circuit 20 in the inverse transformation circuit, as will be shown and described in connection with FIG. 7.

If the unit transformation circuits 20-1 to 20-4 are used in a noise reduction process, the threshold levels are ordinarily chosen according to the expected noise level (that is, noise as expressed in the transform coefficient signals). Therefore, either the noise reduction should occur before the coefficient signals are multiplied or the thresholds should be correspondingly adjusted to account for the increased magnitude of the multiplied transform coefficient signals. Similar considerations may be necessary in other processes involving the transform coefficient signals of the "collapsed" Walsh-Hadamard transform.

Like the ordinary Walsh-Hadamard transform, the "collapsed" version of the Walsh-Hadamard transform is exactly invertible. That is, the same circuits used in the direct transformation may be used in the inverse transformation, from which the processed version of the discrete image signals are obtained. FIG. 7 shows an arrangement of unit transformation circuits 20-6 to 20-11 suitable for inverting the coefficient signals generated by the circuit arrangement of FIG. 6. Each unit transformation circuit 20-6 to 20-11 is a replica of the unit transformation circuit 20 illustrated in FIG. 4. The input signals to the unit transformation circuits 20-6 to 20-8 are the nine distinct coefficient signals $c_{11} \ldots c_{33}$ of the 4 by 4 "collapsed" Walsh-Hadamard transformation, that is, the coefficient signals derived from the operations represented within the box A in FIG. 3. The effect of the remaining seven redundant coefficient signals is provided by the multiplying circuits 48-1 to 48-3 in FIG. 6 and the internal circuitry of the unit transformation circuit 20 itself. With regard to the latter aspect, the coefficient signal connected to the terminal 24 of the unit transformation circuit 20 is used twice, once each by the arithmetic networks 36 and 38—having the effect of doubling its participation in the inverse transform.

As hereinbefore mentioned in connection with FIG. 5, Ser. No. 522,284 (cross-reference (2)) teaches that certain of the transform coefficient signals may be left out of the inverse transform in order to minimize the occurrence of the "false edge" artifact. To practice this technique in connection with FIGS. 6 and 7, some of the coefficient signals (that are to be left out) are in fact duplicated by one or more of the redundant seven coefficient signals. Therefore, the effect of "leaving these coefficient signals out" is obtained by reducing the value of the affected coefficient signals, since each in fact represents more than one coefficient signal in the complete transform. Furthermore, appropriate scaling of all the coefficient signals may be desirable in order to avoid fractional values in the ones reduced.

The output signals from the unit transformation circuits 20-9 to 20-11 constitute a 3 by 3 array of processed image signals $a'_{ij}$. Though the "collapsed" Walsh-Hadamard transform is exactly invertible, the inverse transform circuit differs in appearance from the direct transform circuit of FIG. 6. This is because the processed image signals $a'_{11} \ldots a'_{33}$ are put out in parallel form rather than in the serial form in which image signals $a_{11} \ldots a_{33}$ are presented to the circuit of FIG. 6. A conventional arrangement of parallel-input shift registers, higher in speed than the unit circuits 20, will put the parallel output of the circuit of FIG. 7 back into a serial form. Such an arrangement is within the ordinary skill of one working in this technology.

FIG. 7 is also useful in that it illustrates a circuit arrangement for direct transform if the image signals $a_{11} \ldots a_{33}$ are presented in parallel to the unit transformation circuits 20-6 to 20-8 (in place of the coefficient signals as shown). In that case, the output signals from the unit transformation circuits 20-9 to 20-11 will be the nine distinct coefficient signals $c_{11} \ldots c_{33}$ of the 4 by 4 "collapsed" Walsh-Hadamard transform (in place of the processed image signals $a'_{11} \ldots a'_{33}$ as shown).

Figure 8:
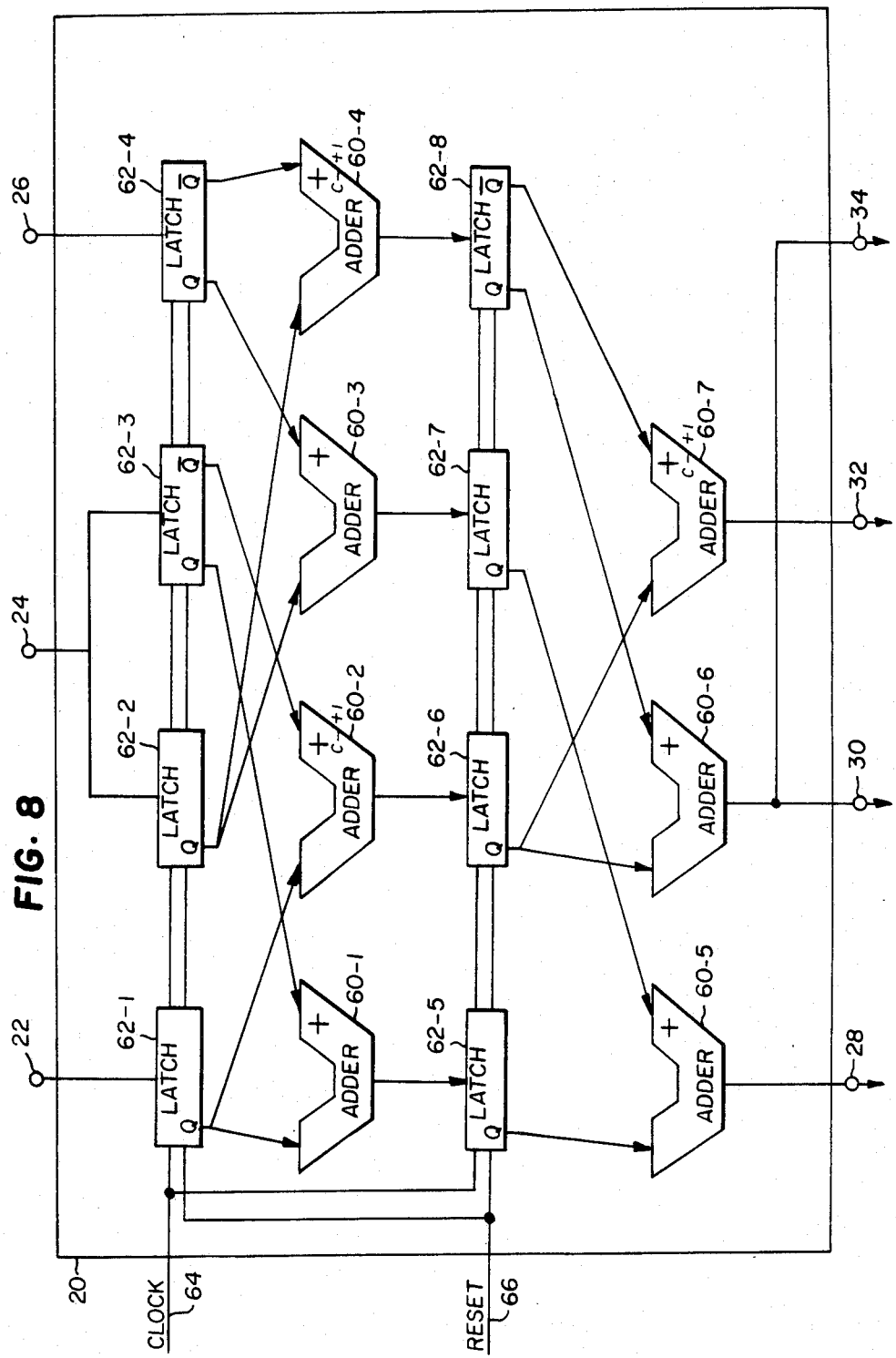
FIG. 8 is a preferred configuration of the unit transformation circuit according to FIG. 4.

FIG. 8 shows a preferred configuration for the unit transformation circuit 20 illustrated in FIG. 4. In practice, it has been found useful to provide the circuit 20 with a 16-bit capacity. Therefore, the arithmetic units described as 44 (adder) and 46 (subtractor) are each composed of a 16-bit adder 60 (four 4-bit 74283 adders connected in parallel, for example) in FIG. 8. The adders 60 are lined in two tiers. The first tier receives their 16-bit input signals from a group of 16-bit latches 62-1 to 62-4 (flip-flops may be used instead of latches to perform the latching function, particularly when edge-triggering is desirable). Pairs of 8-bit 74374 "type D registers" connected in parallel, for example, may be used as latches. The 16-bit inputs to the latches 62-1 to 62-4 comprise the terminals 22, 24 and 26 heretofore discussed in connection with FIG. 4 (input terminal 24 comprises the input terminals of latches 62-2 and 62-3 tied together). Subtraction in the appropriate adder 60-2 and 60-4 is performed by 2's-complementing the output of respective latches 62-3 and 62-4, as shown, i.e., by providing a carryin of +1 to the adder 60-2 and 60-4 and using the negative output $\overline{Q}$ of the latches. In other respects, all the adders are the same.

The 16-bit output signals from the adders 60-1 to 60-4 are delivered to a second tier of latches 62-5 to 62-8 (which may be the same device type as the first tier of latches). Both tiers of latches are connected to external clock and reset lines 64 and 66, respectively. The 16-bit outputs from the second tier of latches 62-5 to 62-8 are connected as shown to a second tier of adders 60-5 to 60-7, of which the adder 60-7 accepts a 2's-complemented signal from the latch 62-8, as shown. The outputs of the adders 60-5 to 60-7 are connected to the output terminals 28, 30, 32 and 34. (Terminal 34 may be eliminated if the preferred configuration of FIG. 8 is used only in connection with the circuits of the type illustrated in FIGS. 6 and 7.)

In operation, an array of three discrete input signals is presented to the input terminals 22, 24 and 26. The calculation of the transform coefficient signals for the "collapsed" Walsh-Hadamard transform is performed during two clock periods. At start-up, the latches are reset to zero by bringing the reset line 66 LOW. Then the calculation is started by bringing the clock line 64 HIGH, thereby causing the latches 62-1 to 62-4 to hold the signal values on the input terminals 22, 24 and 26 and to present these signals to the first tier of adders 60-1 to 60-4. The adders perform the indicated calculations and present the result on their 16-bit output lines. Thereupon the clock line 64 is again brought HIGH. The latches 62-5 to 62-8 hold the calculated signal values from the first tier of adders 60-1 to 60-4 and present these signal values to the second tier of adders 60-5 to 60-7. These adders perform the indicated calculations and provide transform coefficient signals on output terminals 28, 30, 32 and 34.

FIG. 8 describes a preferred configuration for the unit transformation circuit 20. While this configuration can be implemented by means of discrete digital devices (as hereinbefore listed), the preferred implementation is in the form of a single integrated circuit using known techniques of VLSI or LSI technology. For example the unit transformation circuit 20 has been implemented as a semi-custom gate array. The particular type of implementation forms no part of this invention.

The invention has been described in detail with particular reference to presently preferred embodiments thereof, but it will be understood that variations and modifications can be effected within the spirit and scope of the invention. For example, the unit transformation circuit 20 can be used according to the invention in implementing the methods described in the three co-pending cross-referenced patent applications. In particular, the unit transformation circuit 20 may be used in a multi-stage transformation method such as described in copending Ser. No. 441,826 (cross-reference (1)). In that case a configuration of unit transformation circuits 20, such as illustrated in FIG. 5, may be used in each stage of the process. While the unit transformation circuits 20 remain the same regardless of stage, the predetermined period P of the delay 50-1 to 50-5 and 52-1 to 52-5 will depend upon which stage they are in. For example, in the first stage, the period P may be the time corresponding to one line or one image element. In subsequent stages, the period P will correspond to some increased multiple of one line or one image element.

We claim:

1. A unit transformation circuit for transforming three discrete input signals into a set of transform coefficient signals, said circuit comprising:
   means for generating a first sum signal and a first difference signal from the first and second discrete input signals;
   means for generating a second sum signal and a second difference signal from the second and third discrete input signals; and
   means for generating a set of transform coefficient signals from
   (A) the sum of said first and second sum signals,
   (B) the sum of said first and second difference signals, and
   (C) the difference between said first and second difference signals.

2. A unit transformation circuit according to claim 1 in which said means for generating a set of transform coefficient signals comprises:
- means for generating a first transform coefficient signal from the sum of said first and second sum signals;
- means for generating a second transform coefficient signal from the sum of said first and second difference signals; and
- means for generating a third transform coefficient signal from the difference between said first and second difference signals.

3. A unit transformation circuit according to claim 2 in which the set of transform coefficient signals includes a fourth transform coefficient signal that is obtained by means providing a duplicate of said second transform coefficient signal.

4. A transformation circuit comprising at least N unit transformation circuits each according to claim 1 and in which 3N discrete input signals are transformed into a corresponding set of transform coefficient signals.

5. An inverse transformation circuit for inverse transforming a set of transform coefficient signals into a set of processed discrete signals, the inverse transformation circuit comprising a plurality of unit transformation circuits each according to claim 1 in which the set of transform coefficient signals are inverse transformed into processed discrete signals.

6. A transformation circuit including at least one unit transformation circuit for transforming discrete signals provided at a predetermined period P, each unit transformation circuit comprising,
- a first input terminal for receiving a first discrete signal to be transformed;
- a second input terminal for receiving a second discrete signal displaced by predetermined period P with respect to said first discrete signal;
- a third input terminal for receiving a third discrete signal displaced by predetermined period P with respect to said second discrete signal;
- first arithmetic network means connected to said first and second input terminals for providing a first sum and a first difference signal;
- second arithmetic network means connected to said second and third input terminals for providing a second sum and a second difference signal;
- third arithmetic network means for receiving said first and second sum signals and for providing a third sum signal; and
- fourth arithmetic network means for receiving said first and second difference signals and for providing a fourth sum signal and a third difference signal, whereby the third difference signal and the third and fourth sum signals represent a transformation of the discrete signals provided to said input terminals.

7. A transformation circuit including at least one unit transformation circuit for transforming discrete signals occurring at a predetermined period P, each unit transformation circuit comprising
- an input terminal for receiving the discrete signals to be transformed;
- first delay means connected to said input terminal and having a delay period of P;
- second delay means connected to said first delay means and having a delay period of P;
- first arithmetic network means connected to the output of said first delay means and to said input terminal for providing a first sum and a first difference signal;
- second arithmetic network means connected to the outputs of said first and second delay means for providing a second sum and a second difference signal;
- third arithmetic network means for receiving said first and second sum signals and for providing a third sum signal; and
- fourth arithmetic network means for receiving said first and second difference signals and for providing a fourth sum signal and a third difference signal.

* * * * *